Oct. 28, 1930.　　　　C. A. NOONE　　　　1,779,948
ELEVATING DEVICE FOR SHIPPING VEHICLES
Filed July 22, 1929　　　2 Sheets-Sheet 2
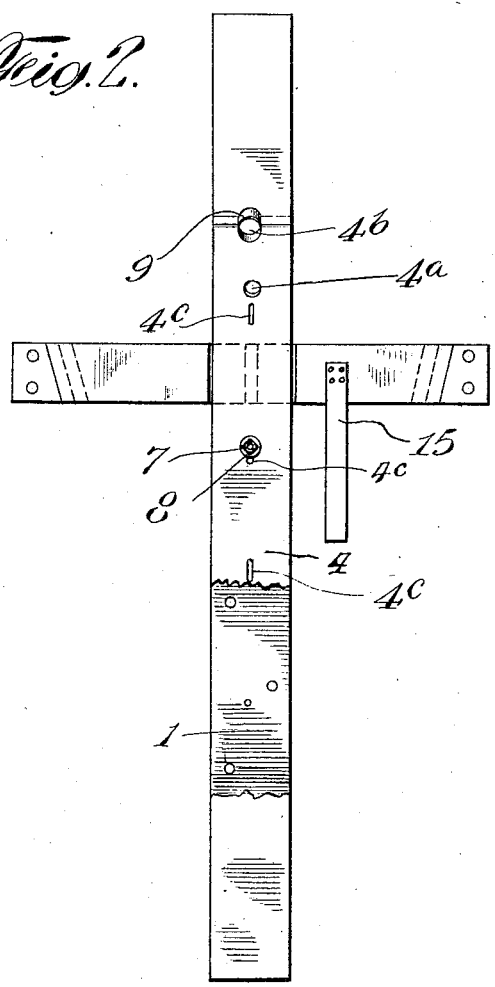
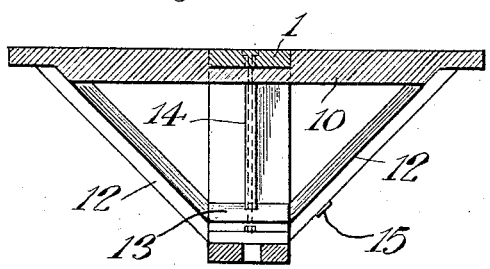
INVENTOR
Charles O. Noone
BY
Emery, Booth, Varney, & Whittemore
ATTORNEYS Patented Oct. 28, 1930

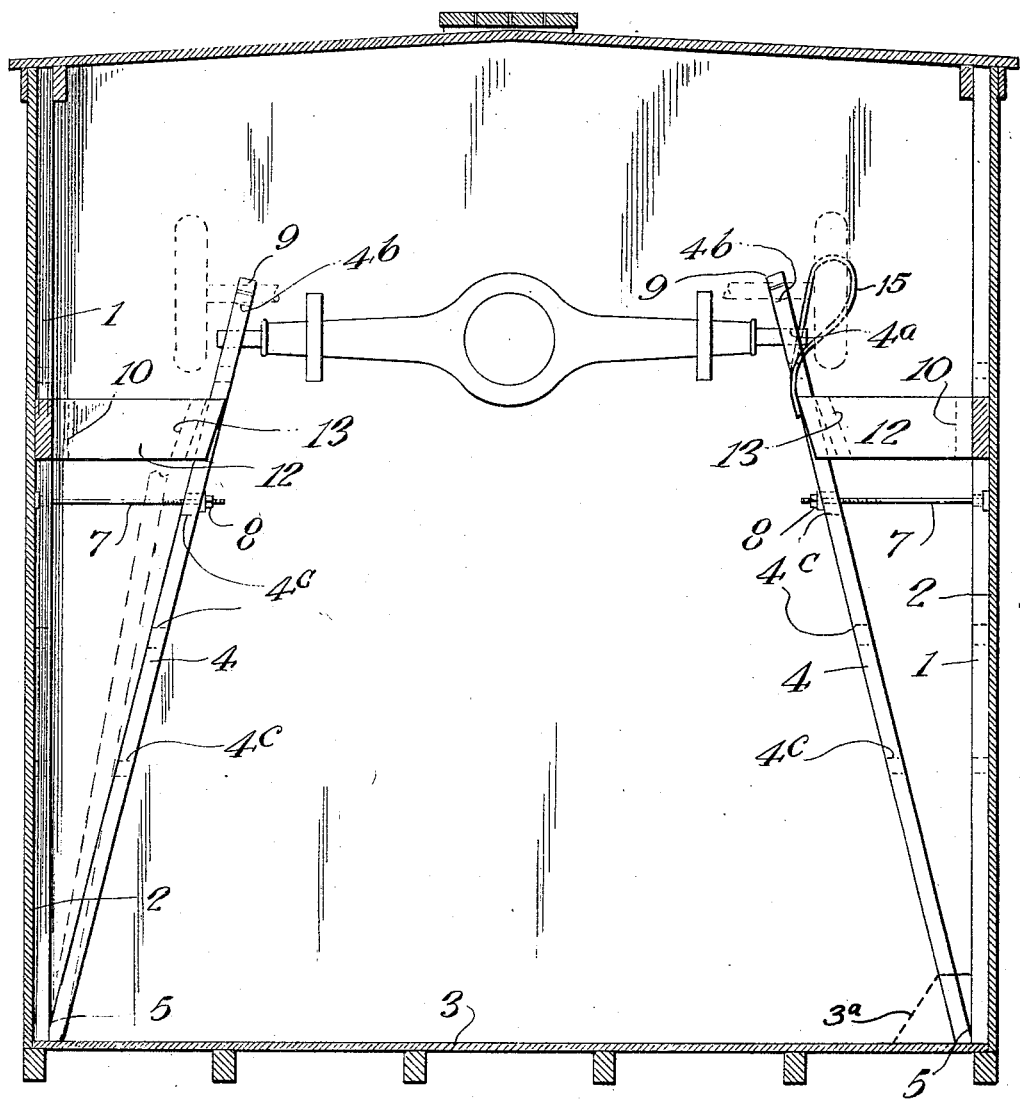

1,779,948

UNITED STATES PATENT OFFICE

CHARLES A. NOONE, OF CHATTANOOGA, TENNESSEE, ASSIGNOR TO THE CHATTANOOGA MANUFACTURING COMPANY, OF CHATTANOOGA, TENNESSEE, A CORPORATION OF TENNESSEE

ELEVATING DEVICE FOR SHIPPING VEHICLES

Application filed July 22, 1929. Serial No. 380,171.

My invention relates to a device for shipping automobiles or other vehicles, and particularly has for its object the provision, in connection with a carrier in which vehicles are shipped in tiers, (or "double-decks") one over the other, of means for elevating and placing and retaining in position the vehicles intended to be carried on the upper decks.

A further object of my invention is to provide means whereby the vehicle, once fastened in place, may be protected against longitudinal and transverse strains from movement during transit or switching operations.

Prior to my invention, apparati in common use for elevating vehicles and retaining them in position during a period of transit were complicated in construction, operation and installation and, consequently, not only were very expensive to manufacture, but their use was fraught with numerous delays and difficulty. My novel device is much simpler in construction than those generally in use today, and by the use of it a vehicle may be placed in position and firmly and permanently braced there against movement in any direction within a very short time.

Moreover my device has the added advantage that it may if desired be constructed almost entirely of wood, and therefore the expense of constructing and installing it is very small compared with that involved in manufacturing and installing steel devices.

In the drawings:

Figure 1 is a view showing my device fully installed and in operation.

Figure 2 is a side elevation showing the apparatus fully installed.

Figure 3 is a view showing the brace construction.

Similar reference characters refer to similar parts in the respective figures.

For convenience in description only one unit will be referred to, and to conserve space only one will be shown in the drawings, although at least two such units and possibly four will be used in actual practice to support each vehicle desired to be carried. For example, if it is desired to carry a greater number of vehicles in one carrier, the devices may be used to support the two front axles only and the rear axles may be blocked or otherwise supported in any suitable well known manner so that the vehicles rest in inclined position. Or if it is desired to carry two "decks" of cars, one unit will be used to support each axle of the car.

Referring now to the drawings:

1 is an upright plank nailed or secured in some other suitable manner to the side wall 2 of a freight car or other similar carrier compartment, (e. g., the hold of a steamship). This plank may be of a length corresponding to the height of the car, or may be shorter as desired. Its lower end preferably rests on the floor 3 of the car.

A plank 4 has one end beveled slightly at 5 so that it may rest firmly against plank 1 when the device is in operative position. A block $3^a$ may if desired be nailed to the car floor 3 to prevent displacement of the plank 4 when the latter is in operative position in a rapidly moving freight-train or steamship. Such block is not an absolute necessity and is therefore shown in dotted lines only in the drawings. As an alternative the plank 4 if desired may be nailed to plank 1 and to the floor when the device is actually loaded ready for use.

Embedded in the plank 1 as by countersinking or similar means is the head of a bolt 7, the end of whose threaded shank passes through an opening $4^c$ in the plank 4. I may find it desirable to provide several such openings with corresponding countersunk bores in the plank 1. This permits the bolt 7 to be placed in different positions according to the make of car being transported, the size of the carrier chamber and the height above the floor to which it is desired to raise the vehicle. The openings $4^c$ are somewhat larger than the diameter of the bolt shank so that when the device is not in actual use plank 4 can be swung inwardly towards plank 1 without the necessity of removing the bolt and thus the apparatus may be installed in a freight car or similar carrier chamber some time before it is actually used, and may remain in place while the vehicles to be carried are being brought into position for elevation without interfering with the operations. Nut 8 on the end of bolt 7 serves to hold the plank 4 against outward movement whether the unit is actually in use or swung back out of the way.

Near the upper end of the plank 4 is an opening 4ª intended to receive and support the axle of an automobile or other vehicle and thus support the vehicle in elevated position, and a groove 4ᵇ is cut in the top end of the plank for the same purpose. If it is desired to carry the vehicle without removing the wheels, the groove 4ᵇ is used, if it is found more advantageous to remove the wheels the opening 4ª is used as a support. If the wheels are not removed and the notches 4ᵇ are used as axle supports a strap 9 is provided, preferably of metal, to hold the axles in place. Figure 1 shows the wheels of the vehicle (in dotted outline and the axle shafts being broken away) positioned in the groove. The groove may if it is desired be lined with tin or other metal.

It will now be seen that when the unit is not in actual use (e. g. during the loading operations and prior to the elevating operation) the upright plank 1 is in position nailed to the side wall of the car, and the plank 4 is in the position shown in dotted lines in Figure 1. When it is desired to place a vehicle in position for transportation, it may be jacked up or elevated by any other known method to a point high enough to insure sufficient clearance for a second vehicle desiring to be positioned underneath it. At the same time the plank 4 is swung forward until the openings 4ª, (or the notches 4ᵇ whichever are used) are opposite the axles of the vehicle, when the axles are passed through the openings 4ª, where they are securely held. If the wheels have not been removed the axles are positioned in the grooves 4ᵇ and fastened therein with the straps 9.

To hold the plank 4 against swinging inward when the freight car is in motion, a brace, constructed in a manner to be presently described is now slipped down into position embracing planks 1 and 4, and the vehicle is in position for shipment.

The construction of the bracing means is as follows: In the preferred form a member 10 is recessed at or near its longitudinal center, the width of the recess substantially corresponding to the width, and of a thickness substantially corresponding to the thickness of the plank 1. To this plank on either side of the central recess are secured arms 12 consisting of two planks nailed or otherwise attached to each other at an angle. The free ends of these arms are adapted to embrace the plank 4. The arms 12 are joined by a piece 13 at a distance from their free ends which is substantially the thickness of the plank 4. This piece 13 is positioned at such an angle to the vertical that one edge will abut against the plank when the brace is in position and wedge it tightly against nut 8. A cross-piece 14 joins pieces 10 and 13 thus holding piece 13 against dislodgment, and a strap 15, preferably of metal, is provided which may be secured around the wheel if the latter is not removed thus serving as additional reinforcement with the brace member proper.

It will be understood that if it appears advantageous, the piece 10 may be constructed in three separate pieces, using three planks therefor, but the form I have described is preferable.

When the brace has been slipped securely into position and the member 10 nailed to the side wall of the car and the strap 15 fastened, the plank 4 will be held against movement in any direction and the vehicle will be secure against both longitudinal and transverse strains when the carrier is in motion.

While I have described my unit as constructed of wood, and while as I have said it is preferably so constructed I do not wish to be understood as limiting myself to a wooden unit.

I claim as my invention:

1. In a device of the class described, a unit comprising an upright support, an obliquely extending support and means firmly embracing both of said supports for holding said obliquely extending support in desired position when the device is in use.

2. In a device of the class described, a unit comprising an upright support, an obliquely extending support one end of which is beveled so that it may rest against the upright support on the floor of a freight car, an opening in said obliquely extending support to receive the axle of a vehicle, and means firmly embracing said upright support and said obliquely extending support for holding said obliquely extending support in desired position when the device is in use.

3. In a device of the class described, a unit comprising an upright member, an obliquely extending member, one end of which is beveled so that it may rest against the upright member on the floor of a freight car, means for preventing said obliquely extending member from slipping out of position on the floor of the car, an opening in said obliquely extending member adapted to receive the axle of a vehicle, a groove in the top of said obliquely extending member also adapted to receive the axle of a vehicle, means for holding the axle in position in the groove, and means for holding said obliquely extending member in position when the device is in use.

4. In a device of the class described, a unit comprising an upright member, an obliquely extending member, one end of which is beveled to rest against said upright member, adjustable means for regulating the inclination of the obliquely extending member, an opening in said obliquely extending member adapted to receive the axle of a vehicle, a groove in the top of said obliquely extending member, also adapted to receive the axle of a vehicle, means for holding in position an axle that has been placed in the groove, and means for holding said obliquely extending member in position when it is in use.

5. In a device of the class described, a unit comprising an upright member, an obliquely extending member, one end of which is adapted to rest on the floor of a freight car or other means of transportation, means for preventing said obliquely extending member from slipping out of position on the car floor, adjustable means for holding said member against outward movement when in use and when not in use and means firmly embracing said member for holding said member against inward movement when in use.

6. In a device of the class described, a unit comprising an upright member, an obliquely extending member, one end of which is adapted to rest on the floor of a freight car or other means of transportation, means for preventing said obliquely extending member from slipping out of position on the car floor, a threaded bolt connecting said upright member and said obliquely extending member, a nut on said bolt adapted to hold said obliquely extending member against outward movement when the device is in use or when it is not in use, and detachable bracing means adapted when in use to embrace both of the aforementioned members.

7. In a device of the class described, a unit comprising an upright member, an obliquely extending member, one end of which is adapted to rest on the floor of a freight car or other means of transportation, means for preventing said obliquely extending member from slipping out of position on the car floor, an adjustable threaded bolt connecting said upright member and said obliquely extending member, and detachable bracing means adapted when in use to embrace both of the aforementioned members.

8. In a device of the class described, a unit comprising an upright member, an obliquely extending member, one end of which is adapted to rest on the floor of a freight car or other means of transportation, and to abut against said upright member, means for preventing said obliquely extending member from slipping out of position on the car floor, an opening in said obliquely extending member adapted to receive the axle of a vehicle, a threaded bolt connecting said upright member and said obliquely extending member, a nut on said bolt adapted to hold said obliquely extending member against outward movement when the device is in use or when it is not in use, and detachable bracing means adapted when in use to embrace both of the aforementioned members.

9. In a device of the class described, a unit comprising an upright member, an obliquely extending member, one end of which is adapted to rest on the floor of a freight car or other means of transportation, and to abut against said upright member, means for preventing said obliquely extending member from slipping out of position on the car floor, an opening in said obliquely extending member adapted to receive the axle of a vehicle, an adjustable threaded bolt connecting said upright member and said obliquely extending member, a nut on said bolt adapted to hold said obliquely extending member against outward movement when the device is in use or when it is not in use, and detachable bracing means adapted when in use to embrace both of the aforementioned members.

10. In a device of the class described, a unit comprising an upright member, an obliquely extending member, one end of which is adapted to rest on the floor of a freight car or other means of transportation, and to abut against said upright member, means for preventing said obliquely extending member from slipping out of position on the car floor, an opening in said obliquely extending member adapted to receive the axle of a vehicle, a groove in the top of said obliquely extending member to receive the axle of a vehicle, a threaded bolt connecting said upright member and said obliquely extending member, a nut on said bolt adapted to hold said obliquely extending member against outward movement when the device is in use or when it is not in use, and detachable bracing means adapted when in use to embrace both of the aforementioned members.

11. In a device of the class described, a unit comprising an upright member, an obliquely extending member, one end of which is adapted to rest on the floor of a freight car or other means of transportation, and to abut against said upright member, means for preventing said obliquely extending member from slipping out of position on the car floor, an opening in said obliquely extending member adapted to receive the axle of a vehicle, a groove in the top of said obliquely extending member to receive the axle of a vehicle, an adjustable threaded bolt connecting said upright member and said obliquely extending member, a nut on said bolt adapted to hold said obliquely extending member against outward movement when the device is in use or when it is not in use, and detachable bracing means adapted when in use to embrace both of the aforementioned members.

12. A detachable bracing means for use with a unit of a vehicle loading device comprising a horizontally extending member, obliquely extending angular members attached at one end to said horizontally extending member, a wedge-member connecting said angular members near their free ends, and a cross-bar connecting said wedge member and the horizontally extending member.

13. A detachable bracing means for use with vehicle loading devices comprising a horizontally extending member, angular members attached at one end to said horizontally extending member and extending obliquely therefrom and in a plane perpendicular to the plane thereof, a wedge-member, connecting near their free ends said angular members, the sides of said wedge-member being in a plane which extends downwardly to meet the plane of the aforementioned horizontally extending member. and a cross-bar connecting said wedge-member and the horizontally extending member.

14. A detachable bracing means for use with vehicle loading devices comprising a horizontally extending member provided with a recess, angular members attached at one end to said horizontally extending member and extending obliquely therefrom and in a plane perpendicular to the plane thereof, a wedge-member connecting near their free ends said angular-members, the sides of said wedge-member being in a plane which extends downwardly to meet the plane of the aforementioned horizontally extending member, and a cross-bar connecting said wedge-member and the horizontally extending member.

15. In a unit of a device for loading vehicles for transportation, an upright member, an outwardly and upwardly extending member, one end of which is adapted to rest on the floor of the carrier, means to prevent said outwardly and upwardly extending member from slipping from position when in use, an opening in said outwardly and upwardly extending member to receive the axle of a vehicle, a groove in the top of said outwardly and upwardly extending member to receive the axle of a vehicle, a strap for holding the axle in the groove, adjustable bolt and nut means connecting said member and said upright member to prevent outward displacement of said member whether it is in use or swung inwards from operative position and toward said upright member, and detachable bracing means adapted to embrace both said members and prevent inward displacement of said outwardly extending member when in use, said bracing means comprising a horizontally extending member, provided with a recess whose width is substantially equal to the width of the upright member, angular members extending in a plane perpendicular to the plane of the horizontally extending member and whose free ends are spaced apart a distance which is substantially the width of said outwardly and upwardly extending member, a wedge-piece connecting the angular members at a distance from the free ends thereof which is substantially the thickness of said outwardly and upwardly extending member, and one edge of which is adapted to abut against said member and hold it against inward displacement when the device is in use, a cross-bar connecting said wedge-member and the single horizontally extending member, and a strap of metal adapted to embrace the outside of said outwardly and upwardly extending member, to prevent said bracing means from slipping from position.

In testimony whereof, I have signed my name to this specification this 13th day of July, 1929.

CHARLES A. NOONE.